(12) United States Patent
Russell et al.

(10) Patent No.: US 7,350,346 B2
(45) Date of Patent: Apr. 1, 2008

(54) TREE FOLLOWER

(75) Inventors: Allen E. Russell, Attica, NY (US); Timothy J. Ozminkowski, Scottsville, NY (US)

(73) Assignee: Oxbo International Corporation, Byron, NY (US)

( * ) Notice: Subject to any disclaimer, the term of this patent is extended or adjusted under 35 U.S.C. 154(b) by 17 days.

(21) Appl. No.: 10/897,379

(22) Filed: Jul. 13, 2004

(65) Prior Publication Data

US 2006/0021319 A1 Feb. 2, 2006

(51) Int. Cl.
*A01D 46/00* (2006.01)

(52) U.S. Cl. ...................................... 56/340.1

(58) Field of Classification Search ........... 56/328.1, 56/329, 340.1; 180/434, 435; 24/274 WB, 24/278
See application file for complete search history.

(56) References Cited

U.S. PATENT DOCUMENTS

| | | | |
|---|---|---|---|
| 4,903,471 A * | 2/1990 | Bunnelle | 56/340.1 |
| 5,010,719 A | 4/1991 | Korthuis | |
| 5,027,593 A | 7/1991 | Korthuis et al. | |
| 5,842,334 A * | 12/1998 | Slates | 56/340.1 |
| 6,155,036 A * | 12/2000 | Pellenc | 56/328.1 |
| 6,178,730 B1 | 1/2001 | Visser | |
| 6,360,518 B1 * | 3/2002 | Scott et al. | 56/328.1 |
| 6,463,725 B1 | 10/2002 | Briesemeister | |
| 6,484,487 B1 | 11/2002 | Buist et al. | |
| 2003/0226345 A1 * | 12/2003 | Mendonca Fava et al. | 56/340.1 |

* cited by examiner

*Primary Examiner*—Árpád Fábián Kovács
(74) *Attorney, Agent, or Firm*—Merchant & Gould PC

(57) ABSTRACT

The present invention is directed to a tree follower device. The tree follower device includes an engagement assembly that penetrates into and shakes the branches of fruit trees to dislodge the fruit. A pressure transducer in communication with a controller measures the pressure resistance from engagement with the branches and moves the tree follower device further into and out of the branches depending upon the resistance. The present invention allows for programming various upper and lower limits and for operating in different modes for different types of trees. The present invention also provides for varying the sensitivity and the speed at which the engagement devices moves into or out of the tree.

22 Claims, 7 Drawing Sheets

TREE FOLLOWER

BACKGROUND OF THE INVENTION

1. Field of the Invention

The present invention relates to a tree follower system and in particular, to a tree follower such as may be used with devices for harvesting fruits and nuts from trees.

2. Description of the Prior Art

Devices for engaging trees and harvesting fruit and nuts are well known. Such devices have shaker assemblies with whorl arrangements that extend into the tree branches and shake the branches to loosen fruit. Examples of such harvester devices are shown in U.S. Pat. No. 6,463,725 to Briesemeister, and U.S. Pat. No. 6,178,730 to Visser. Although such devices have an extendible conveyor and form a seal with the trunk of the tree, following the shape of the branches with the shaker is controlled by the operator driving the harvester device. Although the position can be controlled and there is some flexure from the arrangements engaging the tree branches, positioning of the shaker is often not optimized. If the position is not correct, the harvesting is adversely affected. If the whorl arrangements extend too far into the branches, branches may be damaged or broken. If the whorl arrangements do not protrude sufficiently far into the tree branches, a smaller percentage of the fruit is removed.

It can be appreciated that a system be developed that would maintain the position of the whorl arrangements and the shaker assembly relative to the tree automatically, such a system would improve the efficiency of a harvester device. Such a system would allow the operator to concentrate on driving the harvester rather than positioning the agitator relative to the tree, decreasing fatigue. Such a system should provide for operating in an automatic mode and include an operator override. In addition, the device should be programmable to adapt to various types or sizes of trees. The present invention addresses these as well as other problems associated with harvester devices.

SUMMARY OF THE INVENTION

The present invention is directed to a tree follower device, and in particular to a tree follower device such as may be utilized for fruit harvesters. The tree follower device provides for maintaining a shaker assembly at a proper level of penetration into the tree branches as the harvester passes by the tree. The tree follower device includes a pressure transducer mounted with the shaker assembly to measure the resistance from the tree branches as the shaker engages the tree branches. A controller processes the pressure transducer readings and compares the readings to preselected levels and makes adjustments of the position of the shaker assembly relative to the tree.

In one embodiment, the controller includes a microprocessor that allows for various presets to vary the timing and positioning of the system. A target pressure setting to maintain is also programmed. Upper and lower limits are set so that the tree follower is not constantly retracting and extending. An upper offset is added to the target setting to achieve an upper pressure limit while a lower offset is subtracted from the setting to achieve a lower limit. If the pressure reading from the transducer exceeds the upper limit, the controller directs the tree follower device to retract or swing away from the tree. If the pressure falls below the lower limit, the controller moves the engagement assembly further into the tree.

It can be appreciated that the upper and lower limits as well as the target setting may all be adjusted. Moreover, presets may be programmed based on the differences among the trees, such as different varieties, different sizes, different ages, etc. As different trees are encountered, different presets may be engaged, thereby allowing the operator to simply program a new setting, rather than trying to quickly adjust the settings or reverting to manual operation.

In addition to the various levels at which the tree follower device will initiate movement, the speed and sensitivity of the movement may also be modified. The controller provides for modifying both the speed at which the tree follower moves toward the tree, as well as the speed at which it moves out of the tree. These settings may also be preprogrammed for the various tree types along with each of the associated pressure levels. Moreover, the sensitivity, or the sample rate is also programmable according to the present invention. Greater sensitivity provides for additional sampling and therefore greater change, while a lower sensitivity averages more readings from the transducer and therefore tends to make fewer adjustments in the position of the tree follower.

The present invention provides for simple operation from the cab of a harvester device and for utilizing several presets of parameters for different types of trees or operating conditions. Moreover, the present invention provides for disengagement of the automatic tree follower and reversion to manual operation. The flexibility in programming the tree follower device of the present invention to a particular operating environment and the ability to use presets that may be selected quickly allows the operator to concentrate on driving the harvester with less time required for positioning the engagement assemblies to loosen the fruit or nuts. Such a system greatly reduces operator fatigue and improves the overall quality of the harvesting operation.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views.

DETAILED DESCRIPTION OF THE PREFERRED EMBODIMENT

Figure 1:
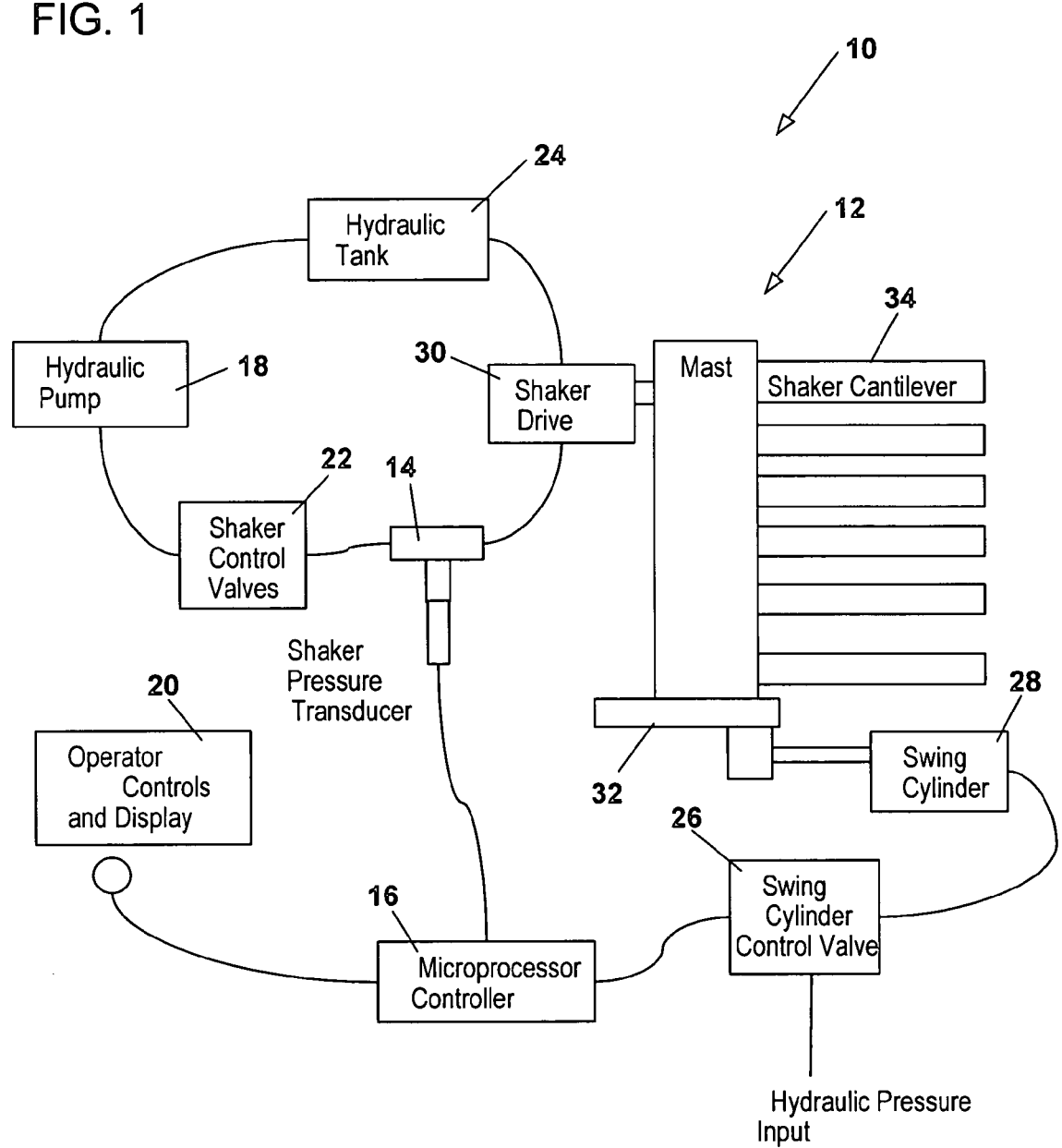
FIG. 1 is a diagrammatic view of a tree follower system according to the principles of the present invention.
Figure 2:
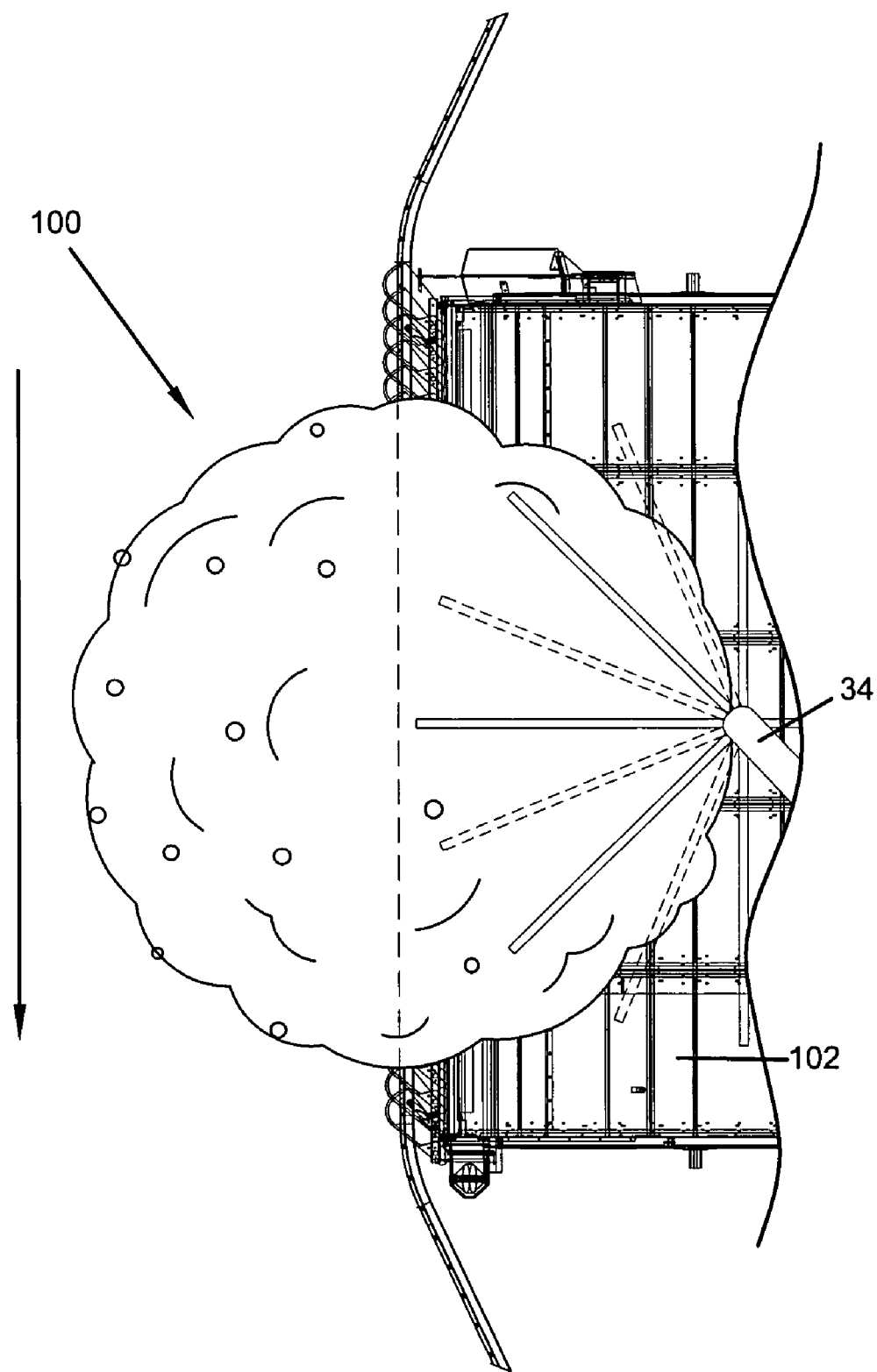
FIG. 2 is a top plan view of a harvester device having the tree follower system shown in FIG. 1.

Referring now to the drawings, wherein like reference letters and numerals indicate corresponding structure throughout the several views and in particular to FIG. 1, there is shown a tree follower system, generally designated 10. The follower system 10 may be utilized on a harvester device, generally designated 100 and shown in FIG. 2. Such harvester devices are well known. An example of a citrus harvester is shown in U.S. Pat. No. 6,463,725 to Briesemeister, incorporated herein by reference.

The harvester 100 generally includes a conveyor 102 mounted on a frame 106. A cab 104 near the rear of the harvester 100 generally includes a controller 16 for the tree follower system 10. The conveyor 102 can be moved laterally inward or outward to generally follow the trunk of the tree and a trunk seal forms a nearly continuous catch surface when the harvesters 100 are used in pairs, so that a large percentage of the loosened fruit is caught and very little fruit falls to the ground. Although the conveyors 102 may utilize a sensor to maintain a seal, only a simple on/off switch is used that is actuated by a linkage and is either engaged or not engaged. The trunk seal system does not include pressure adjustments, ranges or multiple settings.

The harvester 100 also includes a shaker assembly or engagement assembly 12 with the tree follower system 10. The shaker assembly 12 generally includes a mast 32 supporting a number of cantilever arms 34 that support whorl arrangements 36. The whorl arrangements 36 include radially outward extending rods that engage the tree branches and fruit to dislodge the fruit. The arms 34 are driven in either a generally back and forth oscillating motion or orbital motion to dislodge the fruit. A swing cylinder 28 controls the lateral position of the mast 32. The motion to the shaking arms 34 is imparted by a shaker drive system 30. Prior art systems provide for manual operation of the swing cylinder 28. The present invention also may be operated without the automatic tree follower system 10 engaged, as the operator may change the pressure inputs controlling the position of the mast 32. The microprocessor controller 16 includes a display control panel, also shown in FIG. 5, used to monitor and set up the parameters to control the motion of the follower system 10.

As also shown in FIG. 1, the pressure transducer 14 is in communication with the microprocessor controller 16 and pressure is displayed on the controller display 20. A hydraulic pump 18 supplies fluid from a hydraulic tank 24 to the shaker drive 30 and fluid flow is controlled by valves 22. In one embodiment, the pressure transducer is a 5,000 psi max transducer with a 4-20 mA output. The single signal may be input through a 12 bit analog/digital converter that resolves the signal into 4,095 parts over the 5,000 psi range. A suitable controller 16 is found to have a Cygnal 8051C0F20 chip.

Figure 3:
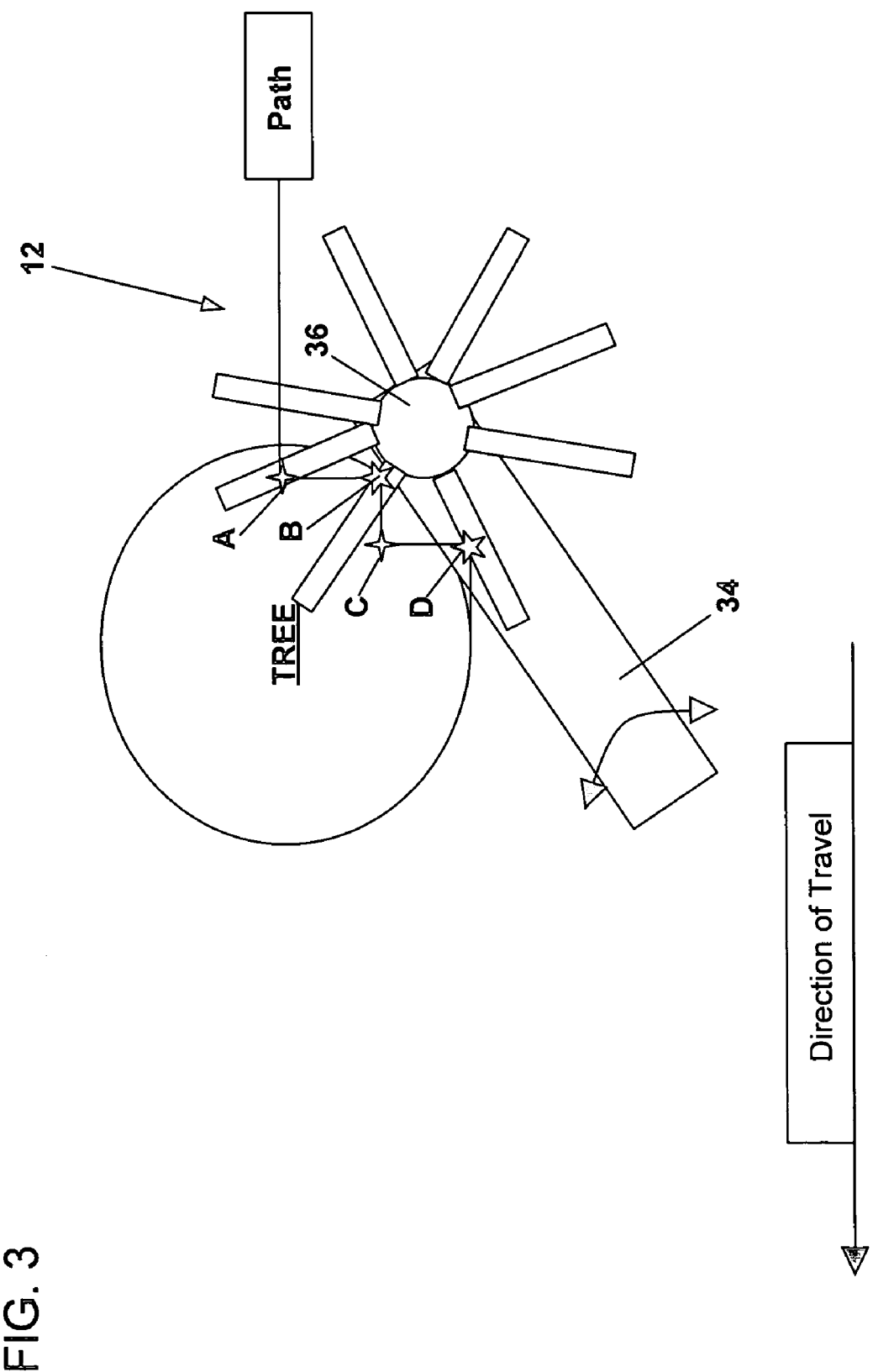
FIG. 3 is a top plan view of the harvester shown in FIG. 2 and a typical path of the tree follower system while engaging the tree and retracting the agitator assembly.
Figure 4:
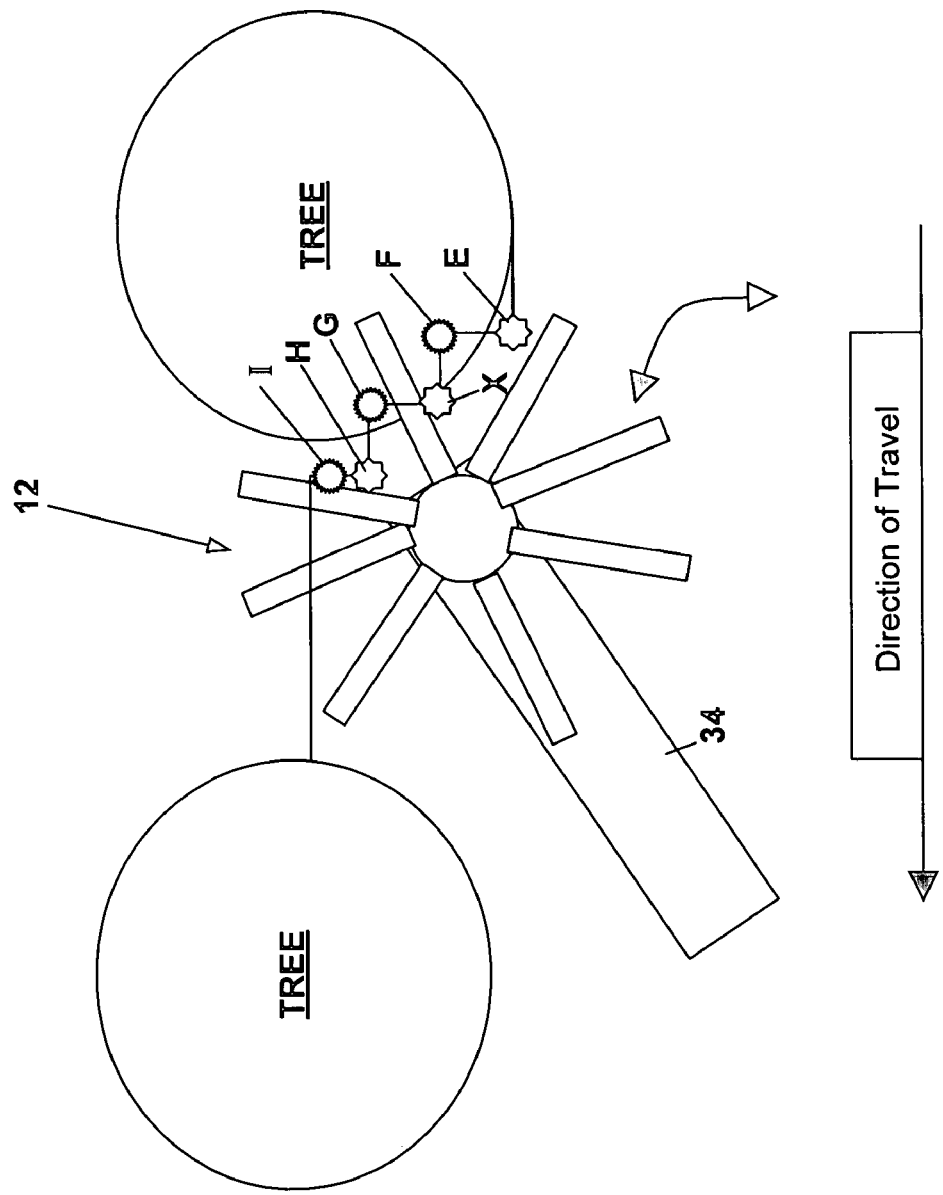
FIG. 4 is a top plan view of the harvester shown in FIG. 2 and a typical path of the tree follower system while engaging the tree and retracting the agitator assembly.

Referring now to FIGS. 3 and 4, there is shown a typical motion for the tree follower system 10 operating in an automatic mode. As shown in FIG. 3, the harvester 100 advances with the shaker assembly 12 at a constant extended position until reaching point A when resistance from the tree rises above a preset limit. This causes the position of the engagement assembly 12 to retract to the position shown at point B. As the shape of the tree is generally round, retraction decreases the resistance pressure from the branches. The harvester 100 continues to advance until reaching point C, wherein the shaker assembly 12 has again protruded deeper into the tree branches and increased resistance is again met. The controller 16 swings the mast 32 away from the tree until the shaker assembly 12 is at point D. At this point, the resistance is decreased and further adjustment of the shaker assembly 12 is not required.

Referring to FIG. 4, as the harvester 100 continues at this retracted position along the direction of travel, the branches extend more toward the direction of travel and resistance decreases, the transducer 14 will sense that the resistance pressure falls below a lower limit, such as at point E. The controller 16 then extends the engagement assembly 12 out to point F wherein the resistance pressure is again within a preselected operating range. The harvester continues onward until reaching a location such as at point G, wherein the branches provide less resistance and the pressure falls below the lower limit. The controller 16 then senses the reduced pressure measured by the transducer 14 and extends the shaker assembly 12 until reaching the location of point H, wherein the pressure becomes sufficiently high to continue operation at this degree of extension. As the harvester 100 travels further, it reaches a location such as point I wherein the shaker assembly 12 disengages from the tree and resistance pressure falls below the lower pressure limit. The controller 16 extends the shaker assembly 12 to the full, extended position, such as shown at point J, and the shaker assembly 12 remains fully extended until engaging another tree wherein the process is repeated such as shown beginning at FIG. 3.

Figure 5:
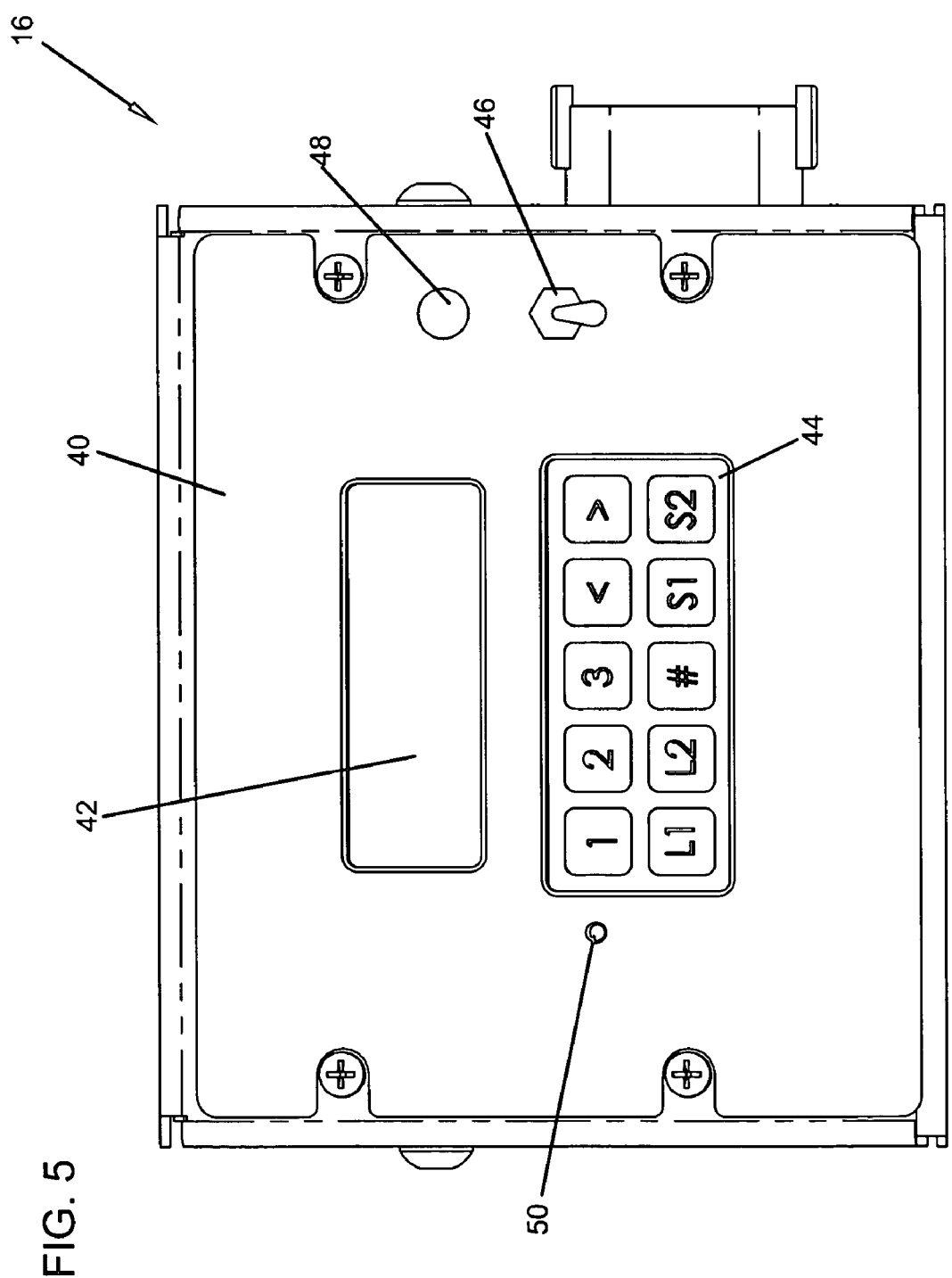
FIG. 5 is a front elevational view of the controller for the tree follower system shown in FIG. 1.
Figure 6:
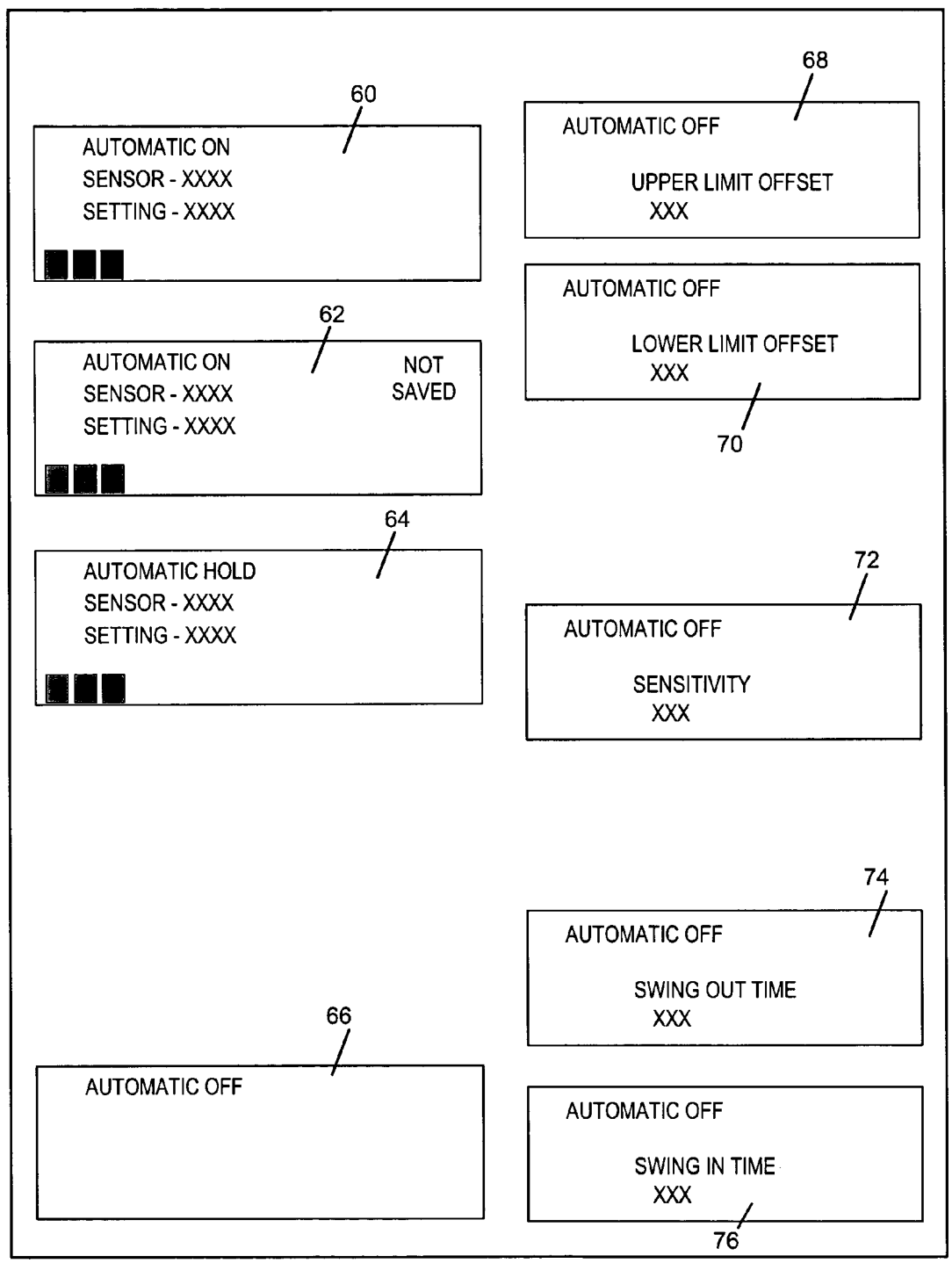
FIG. 6 is a block diagram of programmable parameters for the controller shown in FIG. 1.

In addition to operating to extend and retract, the present invention also provides for optimizing such operations and provides for programming a number of parameters that affect when and how the shaker assembly 12 extends and retracts. Referring to FIGS. 5 and 6, the controller 16 includes a housing 40 with a display screen 42 and a keypad 44. An automatic mode on/off switch 46 provides quick and easy engagement and disengagement of the follower system 10 and includes an indicator light 48 alerting the operator as to whether the system is in the automatic operating mode or in a manual mode. A reset switch 50 is also utilized. The keypad 44 and display screen 42 alert the operator as to various modes and allow the operator to input and vary the operating parameters. The keypad 44 includes keys labeled (1), (2) and (3), representing three different preset modes of operation, as explained hereinafter. The "← →" keys provide for increasing and decreasing parameters. A "#" key changes the sensitivity of the follower. The sensitivity changes the amount of sampling and averaging by the follower and timing between adjustments that occur and therefore, how often the engagement assembly is moving. Keys "L1" and "L2" are limit values for the upper and lower offset from a set pressure mode for operating from a set pressure level for each of the three modes. Keys "S1" and "S2" are for the swing in and swing out time for varying how fast the engagement assembly extends and retracts. Default values are preprogrammed into the controller 16 for these parameters. However, as discussed below, the controller 16 is programmable to customize the operating parameters for several different operating modes.

As shown in FIG. 6, various screen displays are shown that appear to the operator when setting operating parameters for the system. As shown at screen 60, an automatic "on" message displays when the automatic switch is in the "on" position and automatic mode is selected. One of the three modes selected is indicated by a black box appearing adjacent the corresponding mode key. The pressure from the sensor 14 is also displayed, as well as the pressure setting that is the target pressure selected and around which upper and lower limits are set to achieve an operating pressure range, as explained hereinafter. The operator may change the target setting by using the appropriate arrow (← →) key. As shown in display screen 62, if such a setting is not saved, a message appears on the screen to inform the operator. The setting can be saved by pressing the mode button in which the system is operating, to save the setting in that mode.

Screen 64 appears when the operator manually actuates a mast swing switch. This automatically puts automatic operation on hold. To disengage the automatic hold, the operator simply swings the engagement assembly 12 manually in the opposite direction. For example, if the operator manually swings the shaker out of the tree to an automatic hold and manual operation engages, the swing in switch must be pressed to resume automatic operation. Such a function is typically used at the ends of rows of trees to prevent the transducer 14 from sensing no pressure, moving and extending the shaker assembly 12 all the way, which would require further adjustments when a tree is again engaged by the shaker assembly.

Screen 66 is displayed when the automatic tree follower 10 is disengaged. The light 48 is also off on the controller 16. Although the automatic controller system 10 is disengaged, the controller 16 and sensor 14 still have power and the setup values may be modified.

As stated above, the range of operating pressures at which the engagement assembly 12 will move in and out may be varied. This is accomplished by utilizing the target pressure setting, as explained above and shown on screen 62, and then adding an upper limit offset to the setting, as shown on screen 68 or subtracting a lower limit offset from the setting, as shown on screen 70. The upper limit offset is added to the setting to define an upper limit pressure. When the sensor value exceeds the upper limit, the shaker 12 retracts and moves out of the tree. The lower limit is subtracted from the setting value to define the lower limit pressure. When the sensor value is below the lower limit, the shaker extends and moves into the tree. These functions may be changed when the automatic mode is off.

As shown at screen 72, the sensitivity of the processor controller 16 may be varied. The sensitivity controls the averaging of sensor readings that are compared to the upper and lower limits. Lower values for sensitivity make the system respond more quickly to individual sensor reading changes, while higher values average more readings and make the system respond less to individual readings, thereby also moving the shaker assembly less. This function may be modified when the automatic function is turned off.

Referring to screens 74 and 76, the swing out time and swing in time determine the speed with which the shaker moves into and out of the tree. The readings are typically displayed in milliseconds so that low values correspond to short moves while high values correspond to long moves. A typical setting ranges from 50-1000 milliseconds. The timer prevents excessive cycling of the valve and cylinder. The swing times are changeable when the automatic mode is turned off.

In addition to being able to preset the parameters discussed above, it can be appreciated that as different orchards or different types of trees within the orchard are encountered, a typical set of parameters may be utilized repeatedly. For example, different types of trees or different types of citrus or different ages of trees may require different settings. The (1), (2) and (3) keys on the keypad 44 allow for setting sets of parameters for three different modes. Each mode has its own pressure setting, sensitivity, upper limit offset, lower limit offset, swing out time and swing in time. In this manner, as harvesting begins, a particular mode may be selected so that the system 10 does not need to be reprogrammed each time it is used. Moreover, with three different modes, the system does not need to be modified from a single preset. In addition, as changes may be made quickly, the different modes may be utilized from tree to tree if size, age or other factors dictate such changes. The automatic engagement eases the burden on the operator and prevents fatigue from constant adjustment that is necessary without an automatic follower. This is enhanced where variations between trees are accounted for with a simple change to another mode.

Figure 7:
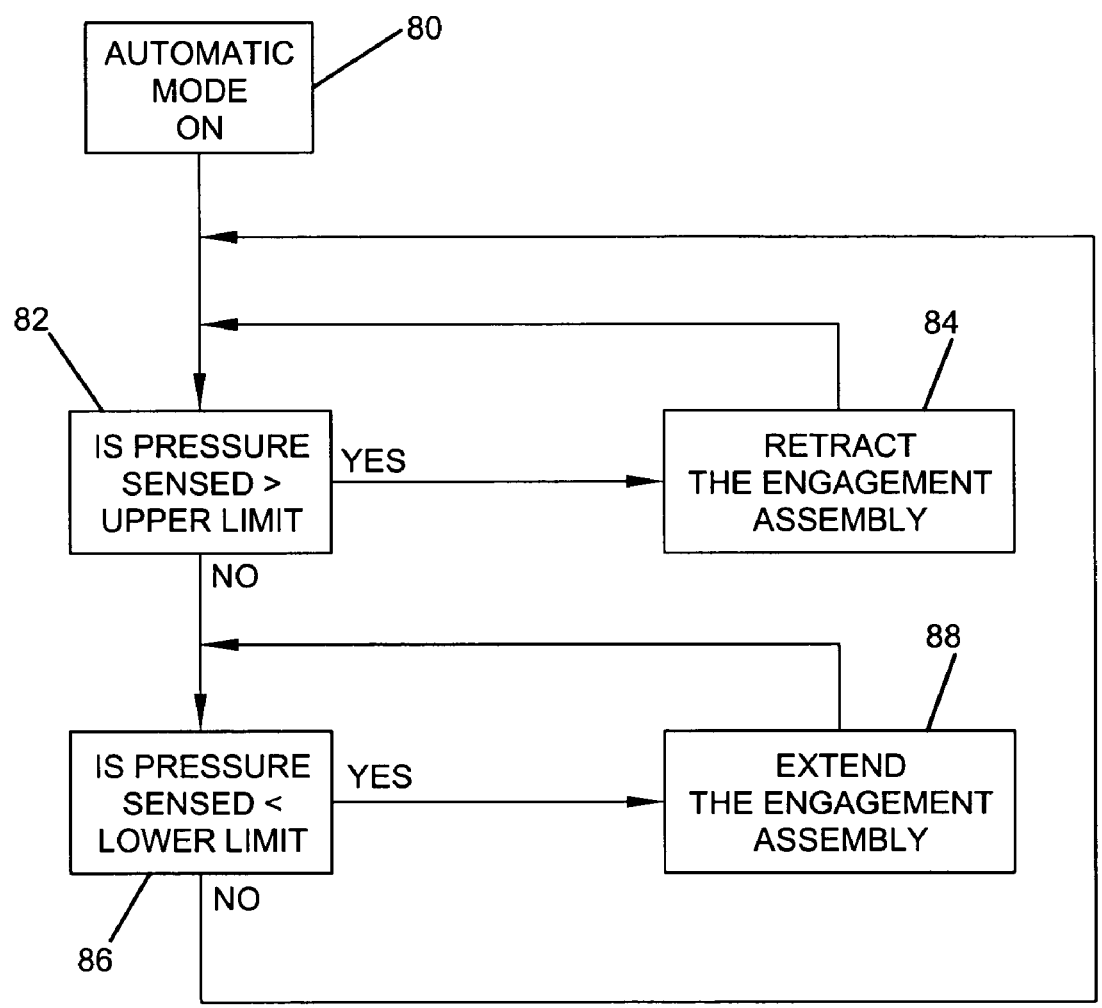
FIG. 7 is a logic diagram for the controller shown in FIG. 5 in an automatic operating mode.

Referring now to FIG. 7, there is shown a block diagram of the logic controlling movement of the agitator assembly 12 in the automatic mode. The automatic mode is engaged as shown at step 80. A determination is made at step 82 comparing the sensed pressure to the upper limit. If the pressure sensed is greater than the upper limit, then the engagement assembly 12 is retracted at step 84. As the assembly retracts, comparison continues until the sensed pressure is less than the upper limit. Then at step 86, the controller compares the set pressure to the lower limit. If the sensed pressure is less than the lower limit, the engagement assembly is extended as shown at step 88. Comparison and extension continue until the sensed pressure is above the lower limit. The controller 16 continues to compare the sensed pressure to the upper and lower limits and retracts and extends as needed in a closed loop as shown in FIG. 7. The control loop is stopped by the automatic mode being disengaged wherein control is maintained by the operator.

The present invention provides a simple reliable system that may utilize a single controller and a single sensor to automatically follow the contour of a tree. This provides for high reliability and repeatability. The present invention also provides for adapting to various tree types, sizes and densities with commonly used presets for multiple commonly found needs. The system is easily installed and may be retrofit to existing harvesters. The system requires very little space in the cab of the harvester and very little attention from the operator, thereby decreasing operator fatigue.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tree follower device, for engaging and positioning relative to branches of a tree, comprising:
   a tree branch shaker assembly configured for extending into the tree branches and shaking the tree branches;
   a shaker drive system imparting a shaking motion to the shaker assembly with a shaking force;
   a transducer in communication with the shaker assembly and sensing resistance to the shaking force of the shaker assembly shaking the tree branches; and
   a positioning system including a controller in communication with the transducer and controlling position of the shaker assembly in response to the resistance to the shaking force from the shaker assembly engaging the tree branches.

2. A tree follower device according to claim 1, wherein the controller extends the shaker assembly if the resistance to the shaker assembly with the tree branches is below a first level.

3. A tree follower device according to claim 1, wherein the controller retracts the shaker assembly if the resistance to the shaker assembly with the tree branches is above a second level.

4. A tree follower device according to claim 1, wherein the tree follower device moves generally along a direction of travel, and wherein the controller controls lateral position of the shaker assembly relative to the direction of travel.

5. A tree follower device according to claim 1, wherein the tree follower device further comprises a hydraulic positioner.

6. A tree follower device according to claim 1, wherein the controller controls duration of extension for the engagement assembly.

7. A tree follower device according to claim 1, wherein the controller controls duration of retraction for the engagement assembly.

8. A tree follower device according to claim 1, wherein the controller uses a target resistance from the free branches to the shaking assembly to maintain engagement.

9. A tree follower device according to claim 8, wherein the controller comprises a lower limit offset, wherein the controller extends the shaker when the resistance to the shaking assembly sensed falls below the target resistance less the offset.

10. A tree follower device according to claim 8, wherein the controller comprises an upper limit offset, wherein the controller retracts the shaker assembly when resistance to the shaking assembly sensed exceeds the target resistance plus the offset.

11. A tree follower device according to claim 1, wherein the controller includes a variable sensitivity, wherein the controller has a variable sampling period.

12. A tree follower device according to claim 1, wherein the controller includes an upper resistance limit, wherein the controller moves the shaker away from the tree when the controller detects a resistance to the shaking assembly above the upper resistance limit.

13. A tree follower device according to claim 1, wherein the controller includes a lower resistance limit, wherein the controller moves the shaker toward the tree when the controller detects a resistance to the shaking assembly below the lower resistance limit.

14. A tree follower device according to claim 1, wherein the controller is programmable for operation in a first selectable mode having first operating parameters, a second selectable mode having second operating parameters, and a third selectable mode having third operating parameters.

15. A tree follower device according to claim 14, wherein the first mode is associated with a first size tree, the second mode is associated with a second size tree and the third mode is associated with a third size tree.

16. A free follower device according to claim 1, wherein the controller includes an automatic mode and a manual override mode.

17. A tree follower device according to claim 1, wherein the controller controls a hydraulic cylinder and retracts the hydraulic cylinder to further engage the tree and extends the hydraulic cylinder to engage the tree less.

18. A tree follower device according to claim 6, wherein the duration of movement of the shaker assembly is independently adjustable for automatic refraction and for automatic extension by the controller.

19. A tree follower device according to claim 1, wherein the shaker assembly comprises a mast and at least one whorl arrangement extending into and engaging the tree branches.

20. A tree follower device according to claim 19, wherein each whorl arrangement comprises a plurality of arms spaced circumferentially apart about a periphery of the mast and extending outward in different radial directions.

21. A tree follower device configured for engaging tree branches of a single side of a tree and positioning relative to the single side of the tree branches, comprising:
- a tree branch shaker assembly extending into the tree branches at the single side of the tree branches;
- a shaker drive system imparting a shaking motion to the shaker assembly with a shaking force;
- a transducer in communication with the shaker assembly and sensing resistance to the shaking force of the shaker assembly imparting a shaking motion to the tree branches at the single side of the tree branches; and
- a positioning system including a controller in communication with the transducer and controlling position of the shaker assembly in response to the resistance to the shaking force from the shaker assembly engaging and shaking the tree branches at the single side of the tree.

22. A tree follower device configured for engaging tree branches of a single side of a tree and positioning relative to the single side of the tree branches, comprising:
- a tree branch shaker assembly having at least one rotatable whorl arrangement having a plurality of arms spaced circumferentially apart about a periphery of a mast and extending outward in different radial directions and configured for engaging the tree branches at a plurality of horizontally spaced apart locations;
- a shaker drive system imparting a shaking motion to the shaker assembly with a shaking force;
- a transducer in communication with the shaker assembly and sensing resistance to the shaking force of the shaker assembly imparting a shaking motion to the tree branches at the single side of the tree branches; and
- a positioning system including a controller in communication with the transducer and controlling position of the shaker assembly in response to the resistance to the shaking force from the shaker assembly engaging and shaking the tree branches at the single side of the tree.

* * * * *